(12) United States Patent
Ahlquist

(10) Patent No.: US 10,706,154 B2
(45) Date of Patent: Jul. 7, 2020

(54) ENABLING A SECURE BOOT FROM NON-VOLATILE MEMORY

(71) Applicant: Micron Technology, Inc., Boise, ID (US)

(72) Inventor: Brent Ahlquist, Loomis, CA (US)

(73) Assignee: Micron Technology, Inc., Boise, ID (US)

( * ) Notice: Subject to any disclaimer, the term of this patent is extended or adjusted under 35 U.S.C. 154(b) by 248 days.

(21) Appl. No.: 15/985,526

(22) Filed: May 21, 2018

(65) Prior Publication Data

US 2018/0276388 A1 Sep. 27, 2018

Related U.S. Application Data

(63) Continuation of application No. 14/693,758, filed on Apr. 22, 2015, now Pat. No. 9,977,902, which is a (Continued)

(51) Int. Cl.
| | | |
|---|---|---|
| *G06F 21/57* | (2013.01) | |
| *G06F 21/60* | (2013.01) | |
| *G06F 9/4401* | (2018.01) | |
| *G06F 12/14* | (2006.01) | |
| *H04L 9/08* | (2006.01) | |
| *G06F 21/79* | (2013.01) | |

(52) U.S. Cl.
CPC .......... *G06F 21/575* (2013.01); *G06F 9/4401* (2013.01); *G06F 9/4405* (2013.01); *G06F 9/4406* (2013.01); *G06F 12/1408* (2013.01); *G06F 21/57* (2013.01); *G06F 21/572* (2013.01); *G06F 21/606* (2013.01); *H04L 9/0841* (2013.01); *G06F 21/79* (2013.01); *G06F 2212/1052* (2013.01); *H04L 2209/24* (2013.01)

(58) Field of Classification Search
CPC .... G06F 12/1408; G06F 21/57; G06F 21/572; G06F 21/575; G06F 21/606; G06F 21/79; G06F 2212/1052; G06F 9/4401; G06F 9/4405; G06F 9/4406; H04L 9/0841; H04L 9/08
See application file for complete search history.

(56) References Cited

U.S. PATENT DOCUMENTS

| | | |
|---|---|---|
| 5,937,063 A | 8/1999 | Davis |
| 6,138,236 A | 10/2000 | Mirov et al. |

(Continued)

OTHER PUBLICATIONS

Arbaugh, William A. et al., "A Secure and Reliable Bootstrap Architecture", 1997 IEEE Security and Privacy Conference, Dec. 2, 1996, 65-71.

(Continued)

*Primary Examiner* — Theodore C Parsons
(74) *Attorney, Agent, or Firm* — Dorsey & Whitney LLP

(57) ABSTRACT

A system may include a host that may include a processor coupled to a non-volatile memory over a secure communication protocol. As a result, prior to release for manufacturing, a binding code may be established between the host and the non-volatile memory. In some embodiments, this binding code may be stored on the non-volatile memory and not on the host. Then during a boot up of the system, the boot up process may be initiated by the host using code associated with the host, followed by secure booting using the secure protocol using code stored on the non-volatile memory.

20 Claims, 1 Drawing Sheet

Related U.S. Application Data continuation of application No. 12/411,784, filed on Mar. 26, 2009, now Pat. No. 9,058,491.

(56) References Cited

U.S. PATENT DOCUMENTS

| | | |
|---|---|---|
| 6,185,678 B1 | 2/2001 | Arbaugh et al. |
| 6,409,089 B1 | 6/2002 | Eskicioglu |
| 6,928,548 B1 | 8/2005 | Hale et al. |
| 7,380,275 B2 | 5/2008 | Srinivasan et al. |
| 7,873,837 B1 | 1/2011 | Lee et al. |
| 8,181,034 B2 | 5/2012 | Elbaum et al. |
| 8,332,652 B2 | 12/2012 | Boivie et al. |
| 8,364,975 B2 | 1/2013 | Kumar et al. |
| 8,560,823 B1 | 10/2013 | Aytek et al. |
| 9,058,491 B1 | 6/2015 | Ahlquist |
| 2002/0087877 A1 | 7/2002 | Grawrock |
| 2003/0018892 A1 | 1/2003 | Tello |
| 2003/0126454 A1 | 7/2003 | Glew et al. |
| 2004/0025036 A1 | 2/2004 | Balard et al. |
| 2004/0088559 A1 | 5/2004 | Foster et al. |
| 2005/0066169 A1 | 3/2005 | Kiehtreiber et al. |
| 2005/0097052 A1 | 5/2005 | Systa et al. |
| 2005/0114338 A1 | 5/2005 | Borthakur et al. |
| 2005/0132186 A1 | 6/2005 | Khan et al. |
| 2005/0138409 A1 | 6/2005 | Sheriff et al. |
| 2005/0289343 A1 | 12/2005 | Tahan |
| 2006/0026417 A1 | 2/2006 | Furusawa et al. |
| 2006/0048221 A1 | 3/2006 | Morais et al. |
| 2006/0090084 A1 | 4/2006 | Buer |
| 2007/0061897 A1 | 3/2007 | Holtzman et al. |
| 2007/0192610 A1 | 8/2007 | Chun et al. |
| 2007/0300068 A1 | 12/2007 | Rudelic |
| 2008/0101109 A1 | 5/2008 | Haring-Bolivar et al. |
| 2008/0104416 A1 | 5/2008 | Challener et al. |
| 2008/0155275 A1 | 6/2008 | Natarajan et al. |
| 2008/0165952 A1 | 7/2008 | Smith et al. |
| 2008/0244269 A1 | 10/2008 | Ishibashi et al. |
| 2009/0094597 A1 | 4/2009 | Moskalik et al. |
| 2009/0113215 A1 | 4/2009 | Aharonov |
| 2009/0285390 A1 | 11/2009 | Scherer et al. |
| 2009/0319782 A1 | 12/2009 | Lee |
| 2010/0082961 A1 | 4/2010 | Gurumoorthy et al. |
| 2011/0131447 A1 | 6/2011 | Prakash et al. |
| 2011/0145600 A1 | 6/2011 | Rudelic |
| 2012/0084438 A1 | 4/2012 | Raleigh et al. |
| 2012/0143967 A1 | 6/2012 | Leonard |
| 2015/0227474 A1 | 8/2015 | Ahlquist |

OTHER PUBLICATIONS

Curry, Ian, "An Introduction to Cryptography and Digital Signatures", Entrust, Online: www.netrust.net/docs/whitepapers/cryptointro.pdf, Mar. 2001.

Dietrich, "Secure Boot Revisited", 9th International Conference for Young Computer Scientists, Nov. 18-21, 2008, 2360-2365.

Sivathanu, G. et al., "Ensuring Data Integrity in Storage: Techniques and Applications", ACM, StorageSS '05, Nov. 11, 2005.

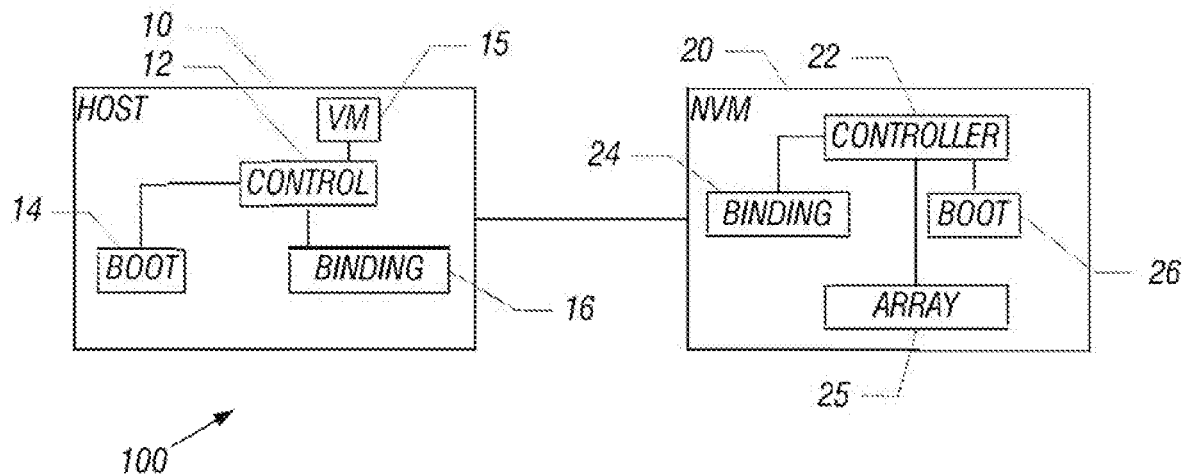
FIG. 1
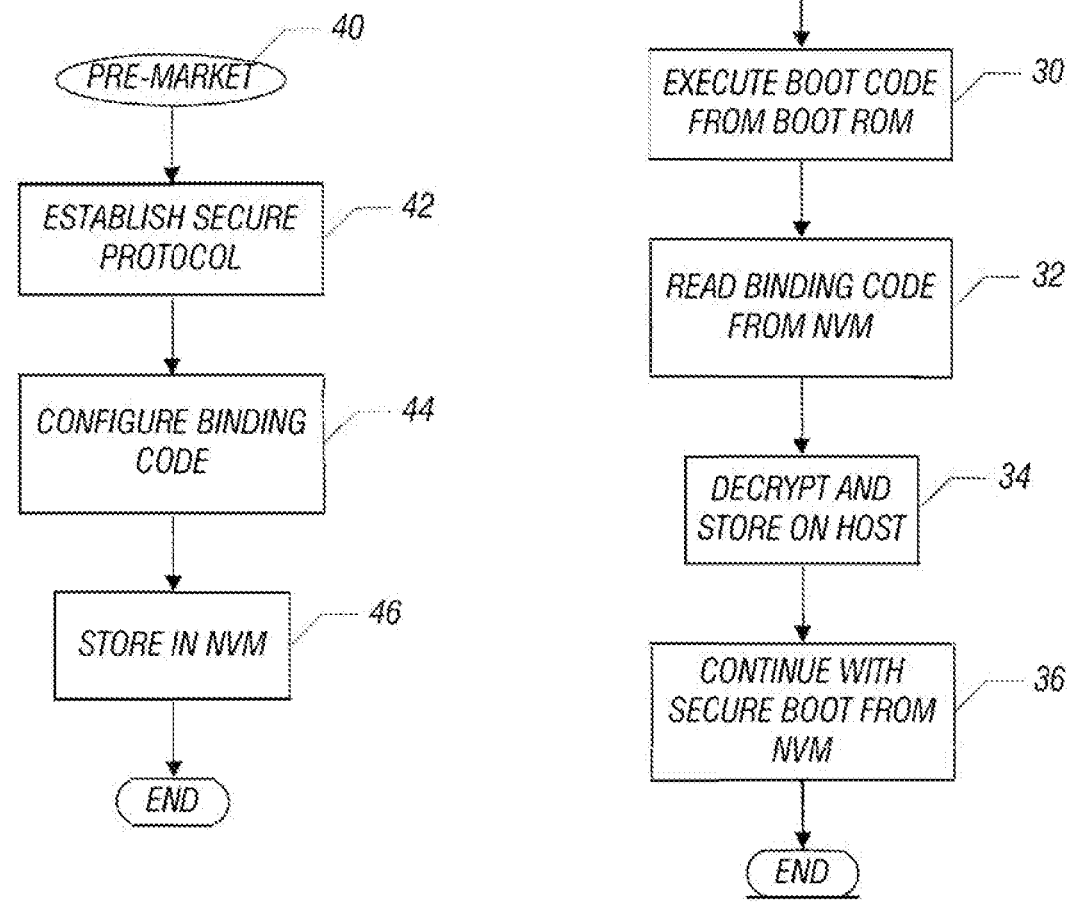
FIG. 2
FIG. 3

ENABLING A SECURE BOOT FROM NON-VOLATILE MEMORY

CROSS-REFERENCE TO RELATED APPLICATIONS

This application is a continuation of U.S. patent application Ser. No. 14/693,758, filed Apr. 22, 2015, which is a continuation of U.S. patent application Ser. No. 12/411,784, filed Mar. 26, 2009, and issued as U.S. Pat. No. 9,058,491 on Jun. 16, 2015. The afore-mentioned applications and patent are hereby incorporated by reference, in their entirety, and for any purpose.

BACKGROUND OF THE INVENTION

This relates generally to processor-based systems and, particularly, to systems for enabling secure booting of processor-based systems.

Conventionally, processor-based systems may involve a processor and a storage that stores code for enabling the system to boot. In many cases, the processor itself may be capable of operating in a secure environment. However, communications between the processor and various non-volatile memories, made by entities other than the processor manufacturer that may be paired in systems with the processor, are not always secure. Thus, an interloper may affect the operation of the system by compromising communications between the non-volatile memory and the processor.

BRIEF DESCRIPTION OF THE DRAWINGS

Specific FIG. 1 is a circuit schematic for one embodiment of the present invention;

FIG. 2 is a flow chart for a pre-market release security binding between a processor and a non-volatile memory for one embodiment; and FIG. 3 is a secure boot protocol in accordance with some embodiments of the present invention.

DETAILED DESCRIPTION

Referring to FIG. 1, a processor-based system 100 may include a host 10 and a non-volatile memory 20. The host 10 may include a processor such as a microprocessor, a controller or a digital signal processor. The system 100 may be any type of processor-based device, including a laptop computer, a desktop computer, a personal digital assistant, a camera, an imaging device, a wireless communication device, such as a cell phone, a media player, or a set top box, to mention a few examples. The non-volatile memory may be a flash memory, a static random memory, or a phase change memory to, mention a few examples. In one embodiment, the memory 20 is a flash memory that has an execute-in-place (XIP) functionality.

In accordance with some embodiments, secure communications and secure booting of the processor-based system may be implemented using code that may be stored, at least in part, on the non-volatile memory 20. This may be done, in some embodiments, without requiring any permanent storage of code, keys, or other material on the host 10 itself.

Thus, in some embodiments, the host 10 may not need to be adapted by the processor manufacturer to the specific requirements needed to implement secure communications and booting with any particular non-volatile memory 20.

Referring to FIG. 1, the host 10 may include a controller 12, which may be a microprocessor in one embodiment. In one embodiment, the host 10 may be a chipset. A boot read only memory (ROM) 14, coupled to the controller, in some embodiments, includes basic boot code to boot the system 100. In some embodiments, the boot may initially be implemented with the boot code stored on the boot ROM 14, with booting continuing through the execution of code stored on the non-volatile memory 20 in the boot code storage 24.

The host 10 may also include a binding code storage 16. While, initially, this code storage may be empty, it may be any memory available on the host 10 to at least temporarily store information to enable secure communications and booting with the non-volatile memory 20. Thus, in some embodiments, the binding code storage 16 may be volatile memory (i.e. dynamic random access memory 20 (DRAM) and, particularly, system memory.

The memory 20 may also include its own controller 22 coupled to the boot code storage 26. It may also include the binding code storage 24 that normally stores the binding code after an initialization process with the host 10. Prior to distribution of the system 100, binding code may be stored in the binding code storage 24 to facilitate communications and booting between the host 10 and the non-volatile memory 20.

Specifically, referring to FIG. 2, prior to market release of the system 100, the pre-market release sequence 40 may be implemented. The sequence 40 may be implemented in hardware or software. In a software embodiment, it may be implemented by a computer readable medium storing instructions executable by a processor. The medium may be a magnetic, semiconductor, or optical storage.

The sequence 40 may be implemented prior to marketing or use of the system 100. For example, it may be implemented by the system manufacturer. In a software implementation, code for the sequence 40 need not be permanently stored on the host 10. Nevertheless, a secure communication protocol may be established between the host 10 and the non-volatile memory 20, as indicated in block 42.

In one embodiment, the host 10 may generate a bind command and parameters and send the command and parameters to the non-volatile memory 20. The bind command and parameters may be generated by the host controller 12 and may be sent to the target non-volatile memory 20. The parameters may convey the key type, for example, a keyed-hash message authentication code (HMAC) or other message authentication code or message integrity code, including the data authentication algorithm, message authentication code based on universal hashing (UMAC), cipher-based message authentication code. The parameters, in one embodiment, include X, g, and n, in the Diffie-Hellman key exchange algorithm and a tag to establish the association, location, or an identifier based on the implementation for the host identify a key in the future. X is equal to g^xmodn, where x is equal to a host-generated random number or pseudorandom number, and g and n are chosen according to the desired key type, key strength, and requirements of the Diffie-Hellman algorithm. The tag is implementation or system specific.

The host accesses a response from the non-volatile memory 20 and extracts the secret key from the response using the Diffie-Hellman algorithm in one embodiment. The key is then temporarily secured in volatile memory (VM) 15, for example, in order to enable secure communications between the host 10 and the non-volatile memory 20 in the pre-market release stage (block 42 of FIG. 2). The host 10 then configures binding code for host-to-memory binding, as indicated in block 44 of FIG. 2. The host may be provided with non-volatile memory specific code. The host encrypts the secret key. Then the host may encrypt and sign (by adding an identifier to the encrypted binding code data) the binding code. Signing the binding code may then be stored (FIG. 2, block 46) in a known location in a non-volatile memory 20 dedicated to binding code storage and, particularly, in the embodiment illustrated in FIG. 1, the binding code storage 24. Thereafter, the system 100 may be sold or transferred to an end user who may attempt to boot the system 100.

In order to boot the system, the boot code 14, shown in FIG. 3, may be utilized. The sequence 14 may be implemented in hardware or software. In a software embodiment, it may be implemented by a computer readable medium storing instructions executable by a processor. The medium may be a magnetic, semiconductor, or optical storage.

Initially, the boot code may be stored in the boot ROM 14. The boot code from the boot ROM may be executed, as indicated in block 30. In response to execution of that boot coder a command to read binding code from the non-volatile memory 20 is issued, as indicated in block 32. Thus, the boot code reads the binding code stored at a known location on the memory 20.

The binding code is decrypted by the host 10 and then stored on the host in the binding code storage 16 (block 34). Then, the boot process continues by reading code from the boot code 26 on the memory 20 (block 36). In one embodiment, this code may be executed in place. A secure communication protocol can be established using the binding code storage pursuant to Diffie-Hellman or any other protocol. The non-volatile memory responds to the parameters from the host by generating a random or pseudorandom number y. The non-volatile memory 20 then generates and stores in its memory, according to association tag k', where k' is equal to X^xmodn, according to the Diffie-Hellman algorithm as the secret key of a key type. Then, the non-volatile memory responds to the host with Y=g^xmodn. The response may request that the host perform a mastered read of response data.

A host device, upon receiving the response, calculates k' equal Y^xmodn from known elements and values provided by the non-volatile memory to obtain the secret key k'. Then, a confidential immutable encryption key (HK) may be encrypt, separately or together, a block of secret key k'. This may be done using all non-volatile memory specific security code since it may not be desirable to store, in the host device memories, information used to support authentication and secure boot processes for particular non-volatile memories. A host-specific mechanism to trigger the execution of this step and manage the process of encrypting the key and code base to be stored may be managed by the host processor and, particularly, may be implemented by a suitable hook contained in the basic boot code stored in association with the host 10.

During the boot process, the host begins by executing code from its boot ROM 14 to access the encrypted blocks in the non-volatile memory 20, decrypt them and relocate the necessary code and secret key to the host internal secure volatile memory 15. Then that key and security code is used to authenticate the remaining code, data, and security characteristics stored in the non-volatile memory. As a result, the secret key may be transferred to the secure non-volatile memory in a secure fashion. Thus, an insecure factory environment may be utilized to assemble the secure system 100.

Security features in processors used in the host 10 may include substantial security capabilities to support that process. In some embodiments, it may be advantageous that the non-volatile memory be an execute-in-place device.

Thus, in some embodiments, it is not necessary to provide a secure factory environment for building the basic system. In addition, the processor is not burdened with any non-volatile memory specific security protocols.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium having instructions stored therein that, when executed by a processor, operates to perform a method comprising:
   transmitting a bind command and one or more parameters to a non-volatile memory;
   accessing a response from the non-volatile memory to the bind command and extracting a secret key;
   encrypting binding code, wherein the binding code is configured to be executed by a host to enable encrypted communications between the host and a non-volatile memory; and
   storing the encrypted binding code in a binding code storage of the non-volatile memory, the binding code storage configured to store the binding code.

2. The computer readable medium of claim 1, wherein transmitting the bind command and the one or more parameters includes transmitting one or more parameters indicative of a key type.

3. The computer readable medium of claim 2, wherein transmitting the one or more parameters includes transmitting at least one of X, g, or n in a Diffie-Hellman key exchange algorithm.

4. The computer readable medium of claim 1, further comprising instructions stored therein that, when executed by a processor, operates to perform the method further comprising:
   storing a first boot code on the non-volatile memory; and
   enabling a second boot code on the host to initiate a booting process and transferring the booting process to the first boot code stored on the non-volatile memory.

5. The computer readable medium of claim 4, further comprising instructions stored therein that, when executed by a processor, operates to perform the method further comprising executing the binding code to facilitate transfer of the first boot code from the non-volatile memory to the host.

6. The computer readable medium of claim 4, further comprising instructions stored therein that, when executed by a processor, operates to perform the method further comprising:
   reading the binding code stored in the non-volatile memory with the second boot code;
   decrypting the binding code with the host; and storing the binding code on the host.

7. A non-transitory computer readable medium having instructions stored therein that, when executed by a processor, operates to perform a method comprising:
   storing a secret key in a volatile memory of a host, the secret key extracted from a response to a bind command;
   establishing encrypted communication between the host and a non-volatile memory via binding code executable by the host, wherein the encrypted communication is established using the secret key to encrypt the binding code stored at the host; and
   storing a boot code in a boot code storage, and providing the boot code and the binding code to the host, wherein the boot code is provided to the host via the encrypted communications.

8. The computer readable medium of claim 7, wherein the non-volatile memory comprises an execute-in-place memory.

9. The computer readable medium of claim 7, further comprising instructions stored therein that, when executed by a processor, operates to perform the method further comprising configuring the host to establish the encrypted communication via a Diffie-Hellman key exchange algorithm.

10. The computer readable medium of claim 7, further comprising instructions stored therein that, when executed by a processor, operates to perform the method further comprising providing the binding code to the host responsive, at least in part, to a request for the binding code from the host.

11. The computer readable medium of claim 10, wherein the request for the binding code from the host is initiated by a second boot code executed on the host.

12. The computer readable medium of claim 7, wherein the boot code is configured to boot the host.

13. The computer readable medium of claim 7, wherein the non-volatile memory comprises flash memory.

14. A method comprising:
   generating, via a host, a bind command;
   receiving the bind command at a non-volatile memory coupled to the host, and generating a response to the bind command and providing the response to the host, the host configured to extract a secret key from the response to the bind command, wherein the host configures a binding code based, at least in part, on the response and provides the binding code to a binding code storage of the non-volatile memory; and
   establishing encrypted communication, via the binding code, between the non-volatile memory and the host when the binding code is executed by the host using the secret key.

15. The method of claim 14, wherein generating, via the host, the bind command includes generating one or more parameters indicative of a key type.

16. The method of claim 14, wherein generating, via the host, the bind command includes generating one or more parameters comprising at least one of X, g, or n in a Diffie-Hellman key exchange algorithm.

17. The method of claim 14, further comprising generating an identification tag for the host to identify a key in the future.

18. The method of claim 14, further comprising generating the bind command responsive to executing a first boot code on the host.

19. The method of claim 18, further includes storing a second boot code on the non-volatile memory.

20. The method of claim 19, further includes executing, via the host, the second boot code responsive, at least in part, to establishment of the encrypted communication between the non-volatile memory and the host.

* * * * *